US012263678B2

(12) United States Patent
Furuzawa et al.

(10) Patent No.: US 12,263,678 B2
(45) Date of Patent: *Apr. 1, 2025

(54) LIQUID EJECTION HEAD AND RECORDING APPARATUS

(71) Applicant: KYOCERA Corporation, Kyoto (JP)

(72) Inventors: Daiki Furuzawa, Kirishima (JP); Shuhei Kawamata, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,259

(22) Filed: Oct. 13, 2023

(65) Prior Publication Data

US 2024/0034063 A1 Feb. 1, 2024

Related U.S. Application Data

(63) Continuation of application No. 17/297,486, filed as application No. PCT/JP2019/045646 on Nov. 21, 2019, now Pat. No. 11,820,143.

(30) Foreign Application Priority Data

Nov. 29, 2018 (JP) ................................ 2018-223522

(51) Int. Cl.
*B41J 2/14* (2006.01)

(52) U.S. Cl.
CPC ....... *B41J 2/14201* (2013.01); *B41J 2/14274* (2013.01); *B41J 2002/14225* (2013.01); *B41J 2002/14241* (2013.01)

(58) Field of Classification Search
CPC ................ B41J 2/14201; B41J 2/14274; B41J 2002/14225; B41J 2002/14241
See application file for complete search history.

(56) References Cited

U.S. PATENT DOCUMENTS

| | | | | |
|---|---|---|---|---|
| 7,810,908 | B2 | 10/2010 | Chikamoto et al. | |
| 11,820,143 | B2 * | 11/2023 | Furuzawa | B41J 2/14201 |
| 2007/0229596 | A1 | 10/2007 | Chikamoto et al. | |

FOREIGN PATENT DOCUMENTS

| | | | |
|---|---|---|---|
| EP | 1905592 | A2 | 4/2008 |
| JP | 2010-012650 | A | 1/2010 |
| JP | 2014-226885 | A | 12/2014 |

* cited by examiner

*Primary Examiner* — Geoffrey S Mruk
(74) *Attorney, Agent, or Firm* — Volpe Koenig

(57) ABSTRACT

A liquid ejection head includes a channel member, a pressurizing part, a cover member, and a sealing member. The channel member includes an ejection hole, a pressurizing chamber, an ejection hole surface, and a pressurizing chamber surface. The pressurizing chamber is connected with the ejection hole. The ejection hole surface is positioned on the ejection hole side. The pressurizing chamber surface is positioned on the pressurizing chamber side. The pressurizing part is positioned in a pressurizing region in the pressurizing chamber surface. The cover member stands on the channel member. The sealing member seals the cover member and the channel member. The channel member includes a groove positioned in the pressurizing chamber surface but outside the pressurizing region. The cover member is positioned in the groove. Further, the sealing member is positioned between a fixing portion in the cover member which is positioned in the groove and the groove.

18 Claims, 11 Drawing Sheets

LIQUID EJECTION HEAD AND RECORDING APPARATUS

CROSS REFERENCE TO RELATED APPLICATIONS

This application is a continuation of U.S. Pat. No. 11,820,143, issued on Nov. 21, 2023, which claims priority to International Patent Application No. PCT/JP2019/045646, filed Nov. 21, 2019, which claims the benefit of Japanese Patent Application No. 2018-223522, filed Nov. 29, 2018, the entire contents of which are incorporated herein by reference.

TECHNICAL FIELD

The present invention relates to a liquid ejection head and a recording apparatus.

BACKGROUND ART

Known in the past has been a liquid ejection head provided with a channel member, a pressurizing part, and a cover member. The channel member has ejection holes, pressurizing chambers connected with the ejection holes, an ejection hole surface positioned on the ejection hole side, and a pressurizing chamber surface positioned on the pressurizing chamber side. Further, the pressurizing part is positioned in a pressurizing region in the pressurizing chamber surface. Further, the cover member is provided standing on the channel member (for example, see Patent Literature 1).

CITATION LIST

Patent Literature

Patent Literature 1: Japanese Patent Publication No. 2010-12650

SUMMARY OF INVENTION

Solution to Problem

A liquid ejection head in the present disclosure includes a channel member, a pressurizing part, a cover member, and a sealing member. The channel member includes an ejection hole, a pressurizing chamber, an ejection hole surface, and a pressurizing chamber surface. The pressurizing chamber is connected with the ejection hole. The ejection hole surface is positioned on the ejection hole side. The pressurizing chamber surface is positioned on the pressurizing chamber side. The pressurizing part is positioned in a pressurizing region in the pressurizing chamber surface. The cover member is provided standing on the channel member. The sealing member seals the cover member and the channel member. Further, the channel member includes a groove positioned in the pressurizing chamber surface but outside the pressurizing region. Further, the cover member is positioned in the groove. Further, the sealing member is positioned between a fixing portion in the cover member which is positioned in the groove and the groove.

A recording apparatus in the present disclosure includes the liquid ejection head disclosed above, a conveying part, and a control part. The conveying part conveys printing paper with respect to the liquid ejection head. The control part controls the liquid ejection head.

DESCRIPTION OF EMBODIMENTS

In a conventional liquid ejection head, the channel member and the cover member directly contacted each other. For this reason, from a micro perspective, a clearance was formed between the channel member and the cover member. When an ink mist reached the clearance between the channel member and the cover member, the problem arose that the ink mist entered into the clearance and reached the pressurizing region. If the ink mist reached the pressurizing region, sometimes an inconvenience occurred in the pressurizing part positioned in the pressurizing region. For this reason, an improvement of the sealing property of the liquid ejection head was needed.

A liquid ejection head in the present disclosure is one improving the sealing property of the liquid ejection head. Below, the liquid ejection head and recording apparatus in the present disclosure will be explained in detail.

Figure 1A:
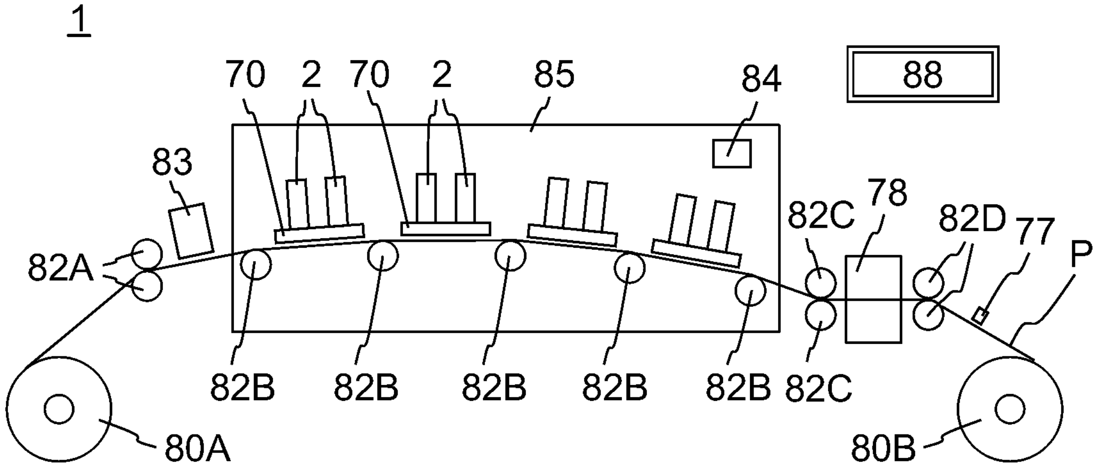
FIGS. 1A and 1B are schematic views of the configuration of a color inkjet printer of a recording apparatus including liquid ejection heads according to an embodiment of the present invention.
Figure 1B:
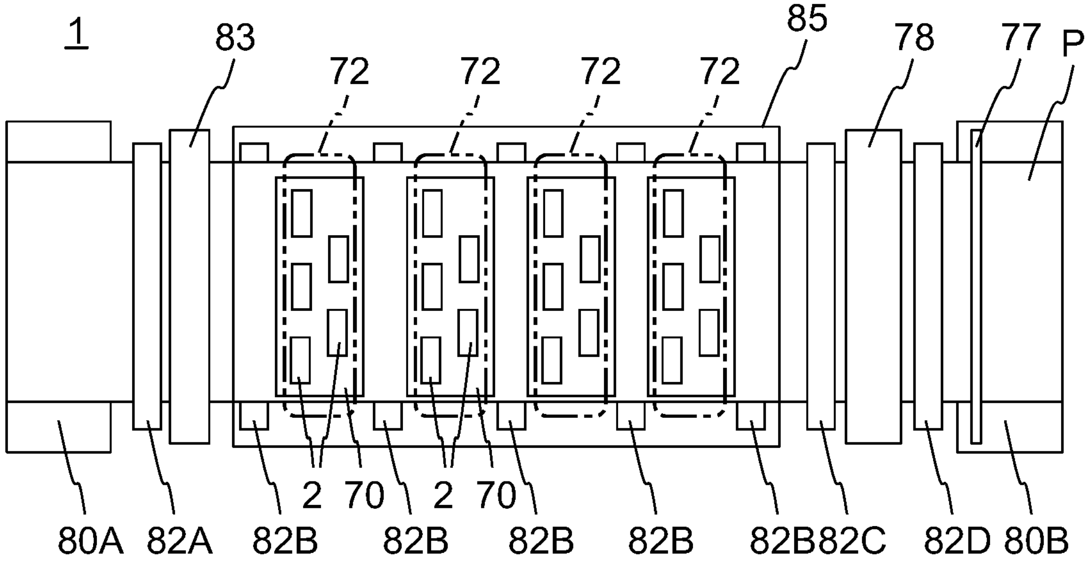

FIG. 1A is a schematic side view of an outline of a color inkjet printer 1 (below, sometimes simply referred to as the printer) including liquid ejection heads 2 as a recording apparatus. FIG. 1B is a schematic plan view.

The printer 1 conveys printing paper P from guide rollers 82A to conveying rollers 82B. The printing paper P relatively moves relative to the liquid ejection heads 2. A control part 88 controls the liquid ejection heads 2 based on data of image or text and makes them eject liquid toward the printing paper P. The printer 1 makes liquid droplets deposit onto the printing paper P to thereby perform printing and other recording.

In the present embodiment, the liquid ejection heads 2 are fixed with respect to the printer 1, so the printer 1 becomes a so-called line printer. As another embodiment of the printer 1, there can be mentioned a so-called serial printer which alternately performs an operation of moving the liquid ejection heads 2 so that they move back and forth in a direction intersecting with the conveying direction of the printing paper P, for example, almost perpendicular direction, while recording and conveyance of the printing paper P.

In the printer 1, flat plate-shaped head mounting frames (below, sometimes simply referred to as "frames") are fixed so as to be substantially parallel to the printing paper P. The frames are provided with not shown pluralities of holes. The liquid ejection heads 2 are mounted in the holes. The distance between the liquid ejection heads 2 and the printing paper P is made for example about 0.5 to 20 mm. The plurality of liquid ejection heads 2 fixed on each frame 70 configure one head group 72. The printer 1 has a plurality of head groups 72.

The liquid ejection heads 2 have long shapes which are elongated in directions from the front side toward the deep portion in FIG. 1A and in the vertical direction in FIG. 1B. In one head group 72, three liquid ejection heads 2 are arranged along the direction intersecting with the conveying direction of the printing paper P. The other two liquid ejection heads 2 are arranged one each between each two liquid ejection heads 2 among the three liquid ejection heads 2 at positions offset along the conveying direction.

The four head groups 72 are arranged along the conveying direction of the printing paper P. To each liquid ejection head 2, a liquid, for example ink, is supplied from a not shown liquid supply tank. To the liquid ejection heads 2 belonging to one head group 72, ink of the same color is supplied. Inks of four colors can be printed by the four head groups 72. The colors of inks ejected from the head groups 72 are for example magenta (M), yellow (Y), cyan (C), and black (K). If such inks are printed by controlling by the control part 88, a color image can be printed. Further, in order to perform surface treatment of the printing paper P, a coating agent or another liquid may be printed as well.

The number of the liquid ejection heads 2 mounted in the printer 1 may be one so far as printing in a single color in a range where printing by one liquid ejection head 2 is possible. The number of the liquid ejection heads 2 included in each head group 72, and the number of the head groups 72 can be suitably changed according to what is printed on or the printing conditions.

The printing paper P is wound around a paper feed roller 80A before use. The printing paper P passes between the two guide rollers 82A, and then passes below the plurality of frames 70, passes between the two conveying rollers 82C and 82D, and is finally collected by the collection roller 80B.

Here, the printed object, other than the printing paper P, may be a rolled fabric and the like as well. Further, the printer 1 may be one placing the paper on a conveyor belt and conveying the same in place of direct conveyance of the printing paper P. Further, in the printer 1, if a conveyor belt is used, a sheet, cut fabric, wood, tile, and the like can be made the printed object. Further, wiring patterns etc. of an electronic apparatus may be printed by ejecting a liquid containing conductive particles from the liquid ejection heads 2 as well. Further, by making the liquid ejection heads 2 eject a predetermined amount of liquid chemical or liquid containing a chemical therefrom toward a reaction vessel or the like, chemical products may be prepared as well.

The printer 1 has a coater 83. The coater 83 is controlled by the control part 88 and uniformly coats a coating agent on the printing paper P. After that, the printing paper P is conveyed to below the liquid ejection heads 2.

The printer 1 has a head case 85 accommodating the liquid ejection heads 2. The interior of the head case 85 is connected with the outside in parts where the printing paper P enters and exits and other parts. However, the interior of the head case 85 is substantially a space separated from the outside. The head case 85, according to need, is controlled in control factors (at least one) of temperature, humidity, atmospheric pressure, etc. by the control part 88 or the like.

The printer 1 has an air blower 84 in the head case 85. The air blower 84 circulates the air in the head case 85. By circulating air by the air blower 84, the internal environment of the head case 85 can be made approach a constant.

The printer 1 has a dryer 78. The printing paper P which leaves the head case 85 passes between the two conveying rollers 82C and passes through the interior of the dryer 78. By the dryer 78 drying the printing paper P, it is made difficult for sheets of the printing paper P taken up one upon another at the collection roller 80B to stick together and for undried liquid to be rubbed off.

The printer 1 has a sensor part 77. The sensor part 77 is configured by a position sensor, speed sensor, temperature sensor, and the like. The control part 88 may judge the states of the parts in the printer 1 from information from the sensor part 77 and control the parts in the printer 1 as well.

The printer 1 may be provided with a cleaning part cleaning the liquid ejection heads 2 as well. The cleaning part for example performs wiping or cleaning by capping. The wiping for example scrapes the surface of the portions from which the liquid is ejected, for example, the ejection hole surfaces 4-1 of the liquid ejection heads 2, by a wiper having flexibility to thereby remove the liquid deposited on the surfaces. The cleaning by capping is for example carried out in the following way. First, caps are placed so as to cover the portions from which the liquid is ejected, for example, the ejection hole surfaces 4-1 (this will be referred to as the capping) and thereby form spaces substantially sealed by the ejection hole surfaces 4-1 and the caps. By repeating the ejection of the liquid in such a state, liquid which has been clogged in the nozzles 3 and has become higher in viscosity than the standard state or foreign substances etc. are removed.

Next, the liquid ejection head 2 in the present invention will be explained.

Figure 2:
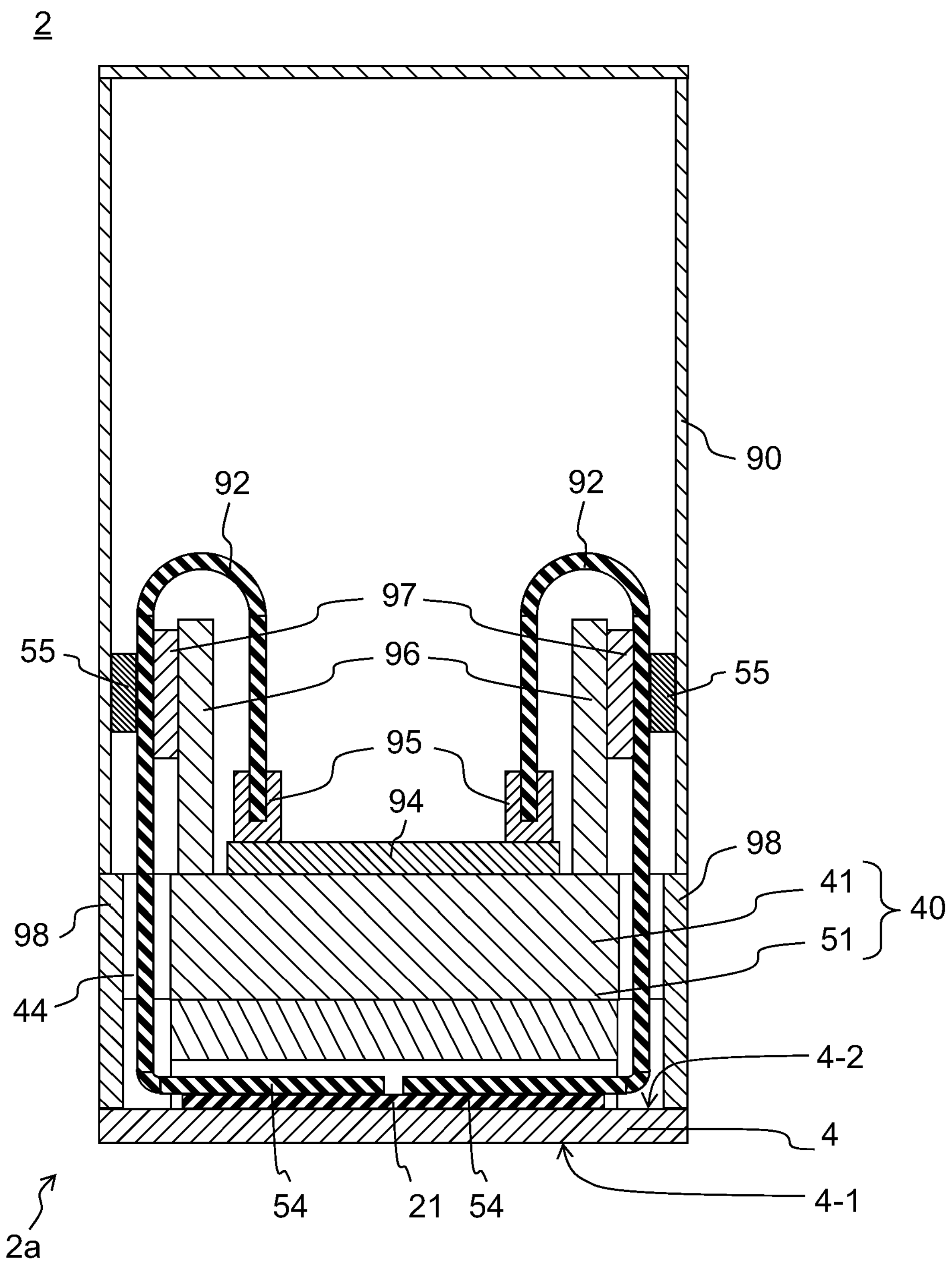
FIG. 2 is a cross-sectional view of the liquid ejection head in FIGS. 1A and 1B.
Figure 3:
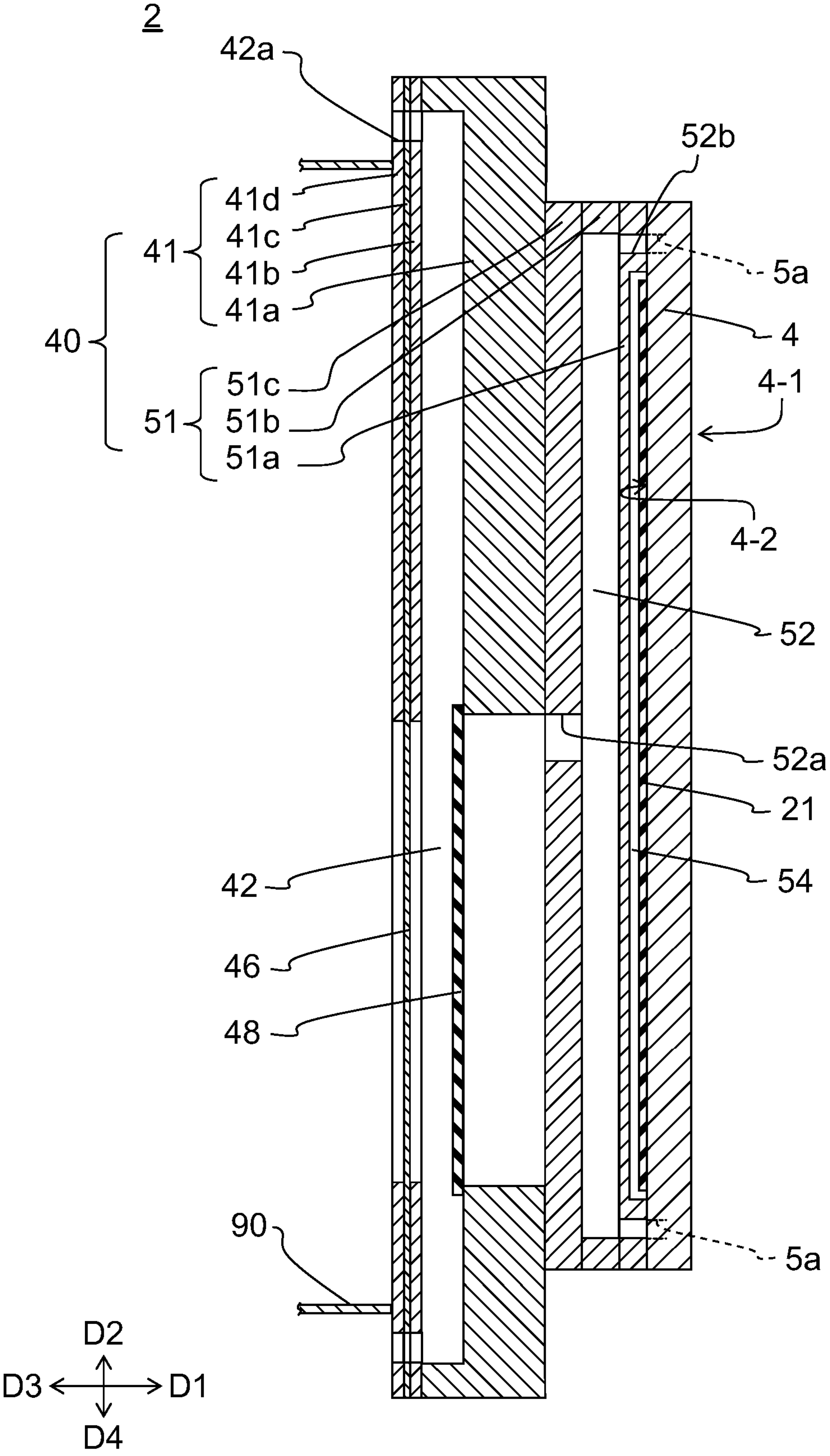
FIG. 3 is a cross-sectional view of the liquid ejection head in FIGS. 1A and 1B.
Figure 4:
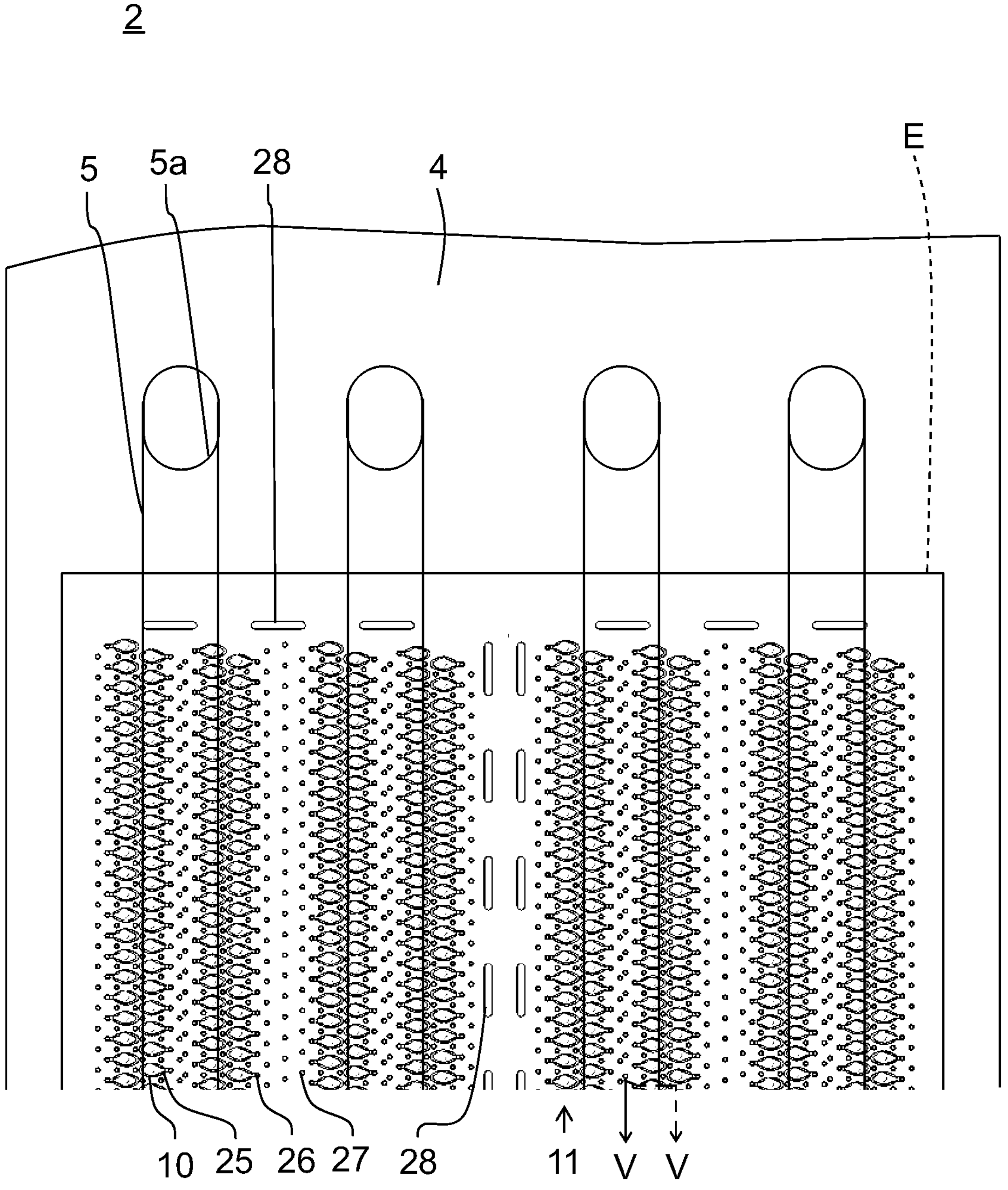
FIG. 4 is a plan view showing a portion of the liquid ejection head in FIGS. 1A and 1B in enlarged manner.
Figure 5:
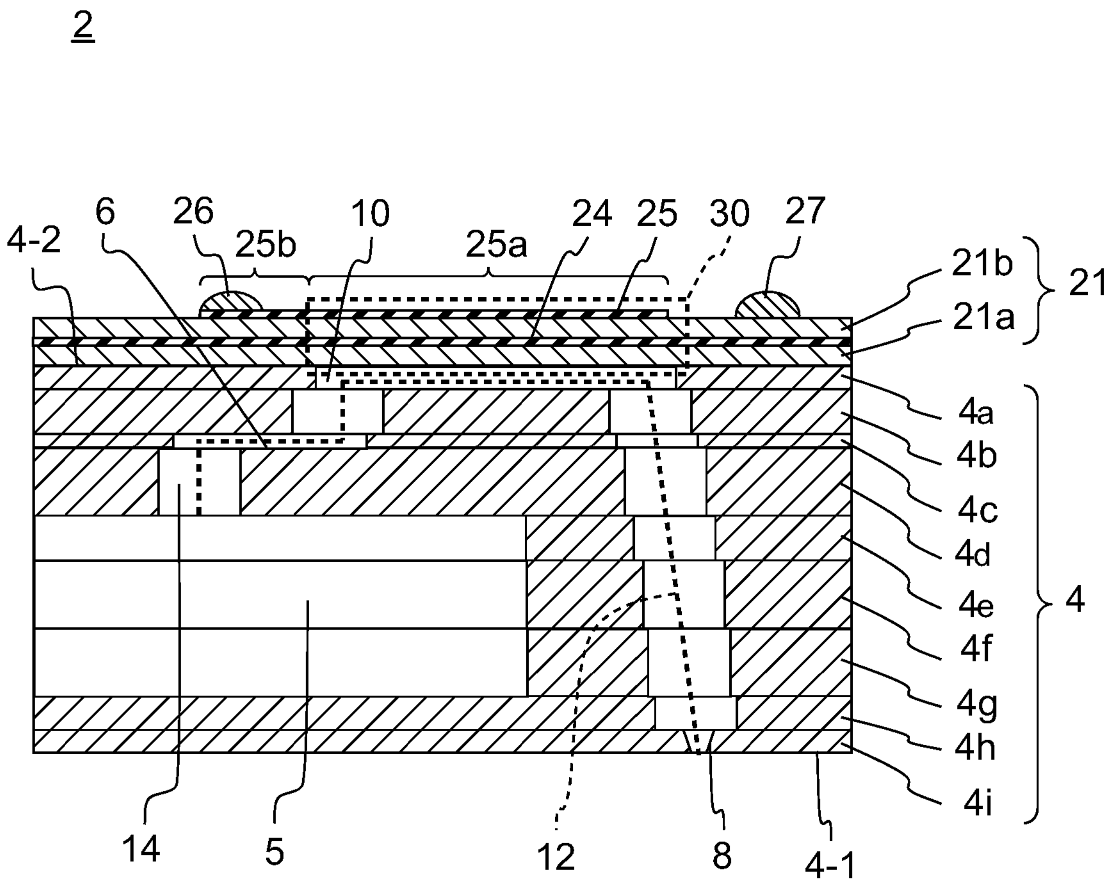
FIG. 5 is a cross-sectional view along the V-V line in FIG. 4.

FIG. 2 is a cross-sectional view in a direction perpendicular to the long direction of the liquid ejection head 2. However, the channels inside the channel member 4 and the reservoir 40 are omitted. FIG. 3 is a cross-sectional view in a direction along the long direction of the liquid ejection head 2. However, some of the parts positioned above the reservoir 40 and the channels inside the channel member 4 are omitted. FIG. 4 is an enlarged view of a head body 2*a* and is a view omitting some of the channels for explanation. Note that, in FIG. 4, for easier understanding of the drawing, manifolds (common channels) 5, ejection holes 8, and pressurizing chambers 10 which are positioned below the piezoelectric actuator substrate 21 and should be drawn by broken lines are drawn by solid lines. FIG. 5 is a vertical cross-sectional view along the V-V line in FIG. 4.

The liquid ejection head 2 includes a head body 2*a*, reservoir housing 90, and cover member 98. The two of the head body 2*a* and the reservoir 40 are long in one direction and are joined so as to extend along each other. The head body 2*a* includes the channel member 4 and piezoelectric actuator substrate 21. The reservoir 40 includes a reservoir body 41 and branched channel member 51. The housing 90 and cover member 98 cover the piezoelectric actuator substrate 21.

The channel member 4 has a plurality of ejection holes 8, plurality of pressurizing chambers 10, and plurality of manifolds 5. The channel member 4 is provided with the ejection hole surface 4-1 in which the plurality of ejection holes 8 are formed. Further, the channel member 4 has the pressurizing chamber surface 4-2 which is the surface of the portion positioned opposite to the ejection hole surface 4-1. In the channel member 4, when the ejection hole surface 4-1 is the lower surface, the pressurizing chamber surface 4-2 is the upper surface. Further, the piezoelectric actuator substrate 21 is joined to the pressurizing chamber surface 4-2 in the channel member 4. Openings of the pressurizing chambers 10 are closed by the piezoelectric actuator substrate 21. The piezoelectric actuator substrate 21 is provided with a displacement member 30. Signal transmission parts 92 such as FPCs (flexible printed circuit) for supplying signals are connected to the piezoelectric actuator substrate 21.

The reservoir 40 is configured by the reservoir body 41 and the branched channel member 51 being joined to each other. In the reservoir body 41, a reservoir channel 42 is formed in the internal portion. The branched channel member 51 has a branched channel 52 formed in its internal portion. Supply holes 42*a* in the reservoir channel 42 are opened toward an external portion. The liquid supplied from the external portion passes through the supply holes 42*a*, reservoir channel 42, and branched channel 52 in that order and supplied to the manifolds 5 in the channel member 4. Note that, the branched channel 52 need not be provided, and the reservoir channel 42 may be directly connected with the manifolds 5.

Further, the channel member 4 and the reservoir 40 are joined by a bonding agent, and a pressurizing part accommodation part 54 becomes a substantially sealed space. Further, in the reservoir 40, vertically penetrating via holes 44 are provided so as to be connected with the pressurizing part accommodation part 54, and the signal transmission parts 92 run inside vertically penetrating via holes 44. The width of the via holes 44 is for example made about 1 to 2 mm.

To the reservoir body 41, pressing plates 96 and a wiring board 94 are fixed. To the pressing plate 96, a heat insulating elastic member 97 is attached. A connector 95 is mounted on the wiring board 94. In the signal transmission part 92, a driver IC 55 is mounted. The signal transmission part 92 is connected to the connector 95.

A driving signal which is sent from the control part 88 through a signal cable to the wiring board 94 is sent through the connector 95 to the signal transmission part 92. The driver IC 55 mounted in the signal transmission part 92 processes the driving signal. The driving signal after processing is sent through the signal transmission part 92 to the piezoelectric actuator substrate 21. The driving signal drives the displacement element 30 and pressurizes the liquid inside the channel member 4 whereby the liquid droplets are ejected. Note that, the wiring board 94 need not be provided, and the signal cable from the control part 88 may be directly connected to the signal transmission part 92.

The signal transmission part 92 is belt-shaped having flexibility. The signal transmission part 92 has metal wirings in its internal portion. Parts of the wirings are exposed at the surface of the signal transmission part 92. By the exposed wirings, the signal transmission part 92 is electrically connected with the connector 95, driver IC 55, and piezoelectric actuator substrate 21.

The driver IC 55 generates heat when performing the driving signal processing explained above. The driver IC 55 is pushed by the pressing plate 96 and heat insulating elastic member 97 through the signal transmission part 92 to be pushed against the housing 90. For this reason, the generated heat is mainly transferred to the housing further quickly spreads in the entirety of the housing 90, and is radiated to the external portion.

The pressing plate 96 is made to flex when the driver IC is attached. By the force of return from this flexing, the driver IC 55 is pushed against the housing 90.

The housing 90 is box shaped and has an opening in the lower surface. In other words, it is a closed bottom tubular body. The housing 90 is one accommodating the head body 2*a* from the opening in the tubular portion and thereby covers the head body 2*a*. The housing can be formed by metal, alloy, or plastic.

The cover member 98 is provided between the channel member 4 and the housing 90. The cover member 98 is provided standing on the channel member 4 and is provided so as to surround the reservoir Note that, the example of forming the cover member 98 and the housing 90 by different members was shown. However, they may be integrally formed as well.

The reservoir 40 is configured by a channel structure body 41*a*, flat plate-shaped plates 41*b* and 41*d*, and damper plate 41*c* stacked on each other. The channel structure body 41*a* can be formed by metal or plastic or ceramic. If it is made of plastic, it can be prepared at a low cost. Further, the plates 40*b* and 40*d* can be formed by plastic or metal. By forming them by plastic, the price can be kept low, and almost no difference occurs in the expansion coefficient between them and the channel structure body 41*a*.

The reservoir 40 has the supply holes 42*a*, reservoir channel 42, damper 46, and filter 48. The reservoir channel 42 extends from one end portion of the reservoir body 41 in the long direction up to the other end portion. The reservoir channel 42 vertically passes through the reservoir 40. The filter 48 is provided at an intermediate position in the span over which the reservoir channel 42 vertically passes through the reservoir body 41 and suppresses passage of foreign matter etc. in the liquid. Further, at each of the two ends of the reservoir channel 42, provision is made of one, i.e., two in total, supply holes 42*a* of the reservoir channel open to the external portion. The reservoir channel 42 is connected with a supply hole (center channel) 52*a* of the branched channel 52 which will be explained later in the center portion in the long direction.

A portion of the inner wall of the reservoir channel 42 forms the damper 46 configured by a damper plate 41*c* made of an elastically deformable material. There is an opening so that the damper 46 can deform toward the direction to which the surface of the damper 46 on the opposite side to the reservoir channel 42 faces. Therefore, by elastic deformation of the damper 46, the volume of the reservoir channel 42 can be changed. For this reason, in a case where the ejection amount of the liquid suddenly becomes large or the like, it becomes possible to stably supply the liquid. The material of the damper plate 41*c* is for example plastic or metal. The thickness is made about 5 to 30 μm.

The branched channel member 51 is provided with a branched channel 52. The supply hole 52*a* in the center portion of the branched channel 52 is connected with the center portion of the reservoir channel 42 in the reservoir body 41. The branched channel 52 is branched midway and connected with openings 5*a* in the manifolds 5 in the channel member 4. By providing the branched channel 52, it becomes harder for a shortage of supply of the liquid to occur.

The branched channel member 51 is configured by a plurality of rectangular shaped plates 51*a* to 51*c* stacked on each other. The branched channel 52 is branched to one side and the other side in the long direction just under the supply hole 52*a* of the branched channel 52, then go toward the lower side near the ends in the long direction and is connected with the openings 5*a* in the manifolds 5 of the channel member 4 at outflow holes 52*b* in the branched channel 52.

A recessed portion is provided between the two ends of the long shape of the branched channel member 51 joined to the channel member 4. The recessed portion becomes the pressurizing part accommodation part 54 in which the piezoelectric actuator substrate 21 is accommodated.

Four manifolds 5 are formed inside the channel member 4. The manifolds 5 have elongated shapes extending along the long direction of the channel member 4. Further, at the two ends of the manifolds 5, the openings 5*a* of the manifolds 5 are formed in the upper surface of the channel member 4. The four manifolds 5 are provided independently from each other. The openings 5*a* are connected with the branched channel 52.

The channel member 4 is formed by a plurality of pressurizing chambers 10 spread out two-dimensionally. The pressurizing chambers 10 are hollow regions having substantially diamond-shaped planar shapes with rounded corner portions. The pressurizing chambers 10 open in the pressurizing chamber surface 4-2 of the upper surface of the channel member 4. Further, the openings of the pressurizing chambers 10 are closed by joining the piezoelectric actuator substrate 21 to the pressurizing region E in the upper surface of the channel member 4.

Each of the pressurizing chambers 10 is connected with one manifold 5 through individual supply channel 14. The pressurizing chambers 10, which are connected with one manifold 5 so as to be along the one manifold 5, form a pressurizing chamber line 11. Two each pressurizing chamber lines 11, i.e., four lines in total, are provided on the two sides of each manifold 5. The intervals between the pressurizing chambers 10 in the long direction in each pressurizing chamber line 11 are the same and become intervals of 37.5 dpi.

The pressurizing chambers 10 in the pressurizing chamber lines 11 are arranged in zigzag-states so that their corner portions are positioned in the adjacent pressurizing chamber lines 11. The pressurizing chambers 10 connected with one manifold 5 configure a pressurizing chamber group. The relative arrangements of the pressurizing chambers 10 in the different pressurizing chamber groups become the same. The pressurizing chamber groups are arranged offset a little in the long direction.

From the corner portions of the pressurizing chambers 10 which face the corner portions connected with the individual supply channels 14, partial channels connected with the ejection holes 8 opened in the ejection hole surface 4-1 of the lower surface of the channel member 4 extend. The partial channels, when viewed on a plane, extend in directions of extensions of the diagonal lines of the pressurizing chambers. In each pressurizing chamber line 11, the pressurizing chambers 10 are arranged at intervals of 37.5 dpi. The pressurizing chambers 10 which are connected with one manifold 5, as a whole, extend over 150 dpi in the long direction. The pressurizing chambers 10 connected with the four manifolds 5 are arranged offset at intervals corresponding to 600 dpi in the long direction. For this reason, the pressurizing chambers 10 are arranged at intervals of 600 dpi in the long direction as a whole. As explained before, the interval of the ejection holes 8 in the long direction also becomes 600 dpi.

The ejection holes 8 are arranged at positions away from the region facing the manifolds 5 arranged on the lower surface side of the channel member 4. Further, the ejection holes 8 are arranged in a region on the lower surface side of the channel member 4 facing the piezoelectric actuator substrate 21.

The channel member 4 has a stacked structure formed by stacking a plurality of plates. These plates, from the upper surface of the channel member 4, include a cavity plate 4*a*, base plate 4*b*, aperture (throttle) plate 4*c*, supply plate 4*d*, manifold plates 4*e* to 4*g*, cover plate 4*h*, and nozzle plate 4*i* in that order. A large number of holes are formed in these plates. By the thickness of each plate being about 10 to 300 μm, the precision of formation of the holes to be formed can be raised. The plates are stacked by positioning so that these holes are communicated with each other and configure the individual channels 12 and manifolds 5.

The individual channels 12 connect the manifolds 5 and the ejection holes 8. The liquid supplied to the manifolds 5 is ejected from the ejection holes 8 by the following route. First, the liquid passes through the individual supply channels 14 from the manifolds 5 toward the upper direction and reaches one end part of the constricted part 6. Next, the liquid advances horizontally along the direction of extension of the constricted part 6 and reaches the other end part of the constricted part 6. The liquid goes therefrom toward an upper part and reaches single end parts of the pressurizing chambers 10. Further, the liquid advances horizontally along the directions of extension of the pressurizing chambers 10 and reaches the other end parts of the pressurizing chambers 10. Further, the liquid advances through the partial channel and is ejected from the ejection holes 8 opened in the ejection hole surface 4-1.

The piezoelectric actuator substrate 21 has a stacked structure configured by two piezoelectric ceramic layers 21*a* and 21*b*. Each of these piezoelectric ceramic layers 21*a* and 21*b* has a thickness of about 20 μm. The thickness of the piezoelectric actuator substrate 21 from the lower surface of the piezoelectric ceramic layer 21*a* up to the upper surface of the piezoelectric ceramic layer 21*b* is about 40 μm. The two layers of the piezoelectric ceramic layers 21*a* and 21*b* extend so as to straddle the plurality of pressurizing chambers 10. These piezoelectric ceramic layers 21*a* and 21*b* are formed by a lead zirconate titanate (PZT) based ceramic material having ferroelectricity.

The piezoelectric actuator substrate 21 has a common electrode 24, individual electrodes 25, connection electrodes 26, dummy connection electrodes 27, and surface electrodes 28. The common electrode 24 is formed by Ag—Pd based metal material or other metal material. The common electrode 24 is formed covering over almost the entire surface in the surface direction in the region between the piezoelectric ceramic layer 21*a* and the piezoelectric ceramic layer 21*b*. The thickness of the common electrode 24 is about 2 μm. The surface electrodes 28 are formed on the piezoelectric ceramic layer 21*b* at positions away from the electrode groups configured by the individual electrodes 25. The common electrode 24 is connected to the surface electrodes 28 through via holes formed in the piezoelectric ceramic layer 21*b*, is grounded, and is held at the ground potential. In the same way as the large number of individual electrodes 25, the surface electrodes 28 are connected with separate electrodes on the signal transmission part 92. The surface electrodes 28 are formed in two lines in the center portion in the short direction of the piezoelectric actuator substrate 21 so as to run along the long direction. Further, the surface electrodes 28 are formed in one line so as to run along the short direction near the end in the long direction.

An individual electrode 25 has an individual electrode body and an extraction electrode 25*b*. The individual electrode 25 is arranged at a position which is on the upper surface of the piezoelectric actuator substrate 21 and which faces each pressurizing chamber 10. The individual electrode body 25*a* is smaller by one size than the pressurizing chamber 10 and has a substantially similar shape to that of the pressurizing chamber 10. The extraction electrode 25*b* is led out from the individual electrode body 25*a*.

A connection electrode 26 is led out to the outside of the region which faces the pressurizing chamber 10 and on one end of the extraction electrode 25*b*. The connection electrode 26 is made of for example silver-palladium containing glass frit and is formed in projecting state to a thickness of about 15 μm. The connection electrode 26 is electrically bonded with an electrode provided in the signal transmission part 92. A dummy electrode 27 is arranged in a region where no connection electrode 26 is positioned. The dummy connection electrode 27 connects the piezoelectric actuator substrate 21 and the signal transmission part 92, raises the connection strength, and makes the distribution of the parts which are connected on the piezoelectric actuator substrate 21 uniform, therefore connection can be stably carried out when connecting them.

The portions in the piezoelectric actuator substrate 21 which face the pressurizing chambers 10 correspond to individual displacement elements 30 corresponding to the pressurizing chambers 10 and ejection holes 8. A displacement element 30 is formed for each pressurizing chamber 10 by a piezoelectric ceramic layer (vibration plate) 21*a*, common electrode 24, piezoelectric ceramic layer 21*b*, and individual electrode 25 which are positioned right above the pressurizing chamber 10. The displacement element 30 is accommodated in the pressurizing region E.

Each of the plurality of individual electrodes 25 is individually electrically connected through the signal transmission part 92 and a wiring with the control part 88 so that its potential can be individually controlled. When rendering the individual electrode 25 a potential different from that of the common electrode 24 and supplying an electric field with respect to the piezoelectric ceramic layer 21*b* in its polarization direction, the portion supplied with this electric field works as an active portion which warps according to the piezoelectric effect. In this configuration, if the individual electrode 25 is rendered the positive or negative predetermined potential relative to the common electrode 24 by the control part 88 so that the electric field and polarization become the same direction, the portion (active portion) of the piezoelectric ceramic layer 21*b* which is sandwiched by the electrodes contracts in the surface direction. On the other hand, the piezoelectric ceramic layer 21*a* of an inactive layer is not influenced by the electric field, therefore it does not voluntarily contract and tries to restrict the deformation of the active portion. As a result, a difference arises in distortion in the surface direction between the piezoelectric ceramic layer 21*b* and the piezoelectric ceramic layer 21*a*, therefore the piezoelectric ceramic layer 21*b* deforms (causes unimorph deformation) so as to project to the pressurizing chamber 10 side.

The actual driving procedure in the present embodiment includes rendering the individual electrodes 25 higher potentials than the common electrode 24 (below, referred to as high potentials) in advance, renders the individual electrodes 25 the same potentials as that of the common electrode 24 (below, referred to as the low potentials) whenever an ejection request is issued, then renders them the high potentials again at a predetermined timing. Due to this, at the timing when the individual electrodes 25 become low potentials, the piezoelectric ceramic layers 21*a* and 21*b* return to their original shapes, therefore the volume of the pressurizing chamber 10 increases compared with the initial state (state where the potentials of the two electrodes are different). At this time, a negative pressure is given to the interior of the pressurizing chambers 10, therefore liquid is sucked into the pressurizing chambers 10 from the manifold side. After that, at the timing when the individual electrodes 25 are rendered the high potentials again, the piezoelectric ceramic layers 21*a* and 21*b* deform so as to project to the pressurizing chamber side, the pressure in the pressurizing chambers 10 becomes a positive pressure due to a reduction of the volume of the pressurizing chambers 10, and the pressure to the liquid rises, thus the liquid droplets are ejected.

Figure 6:
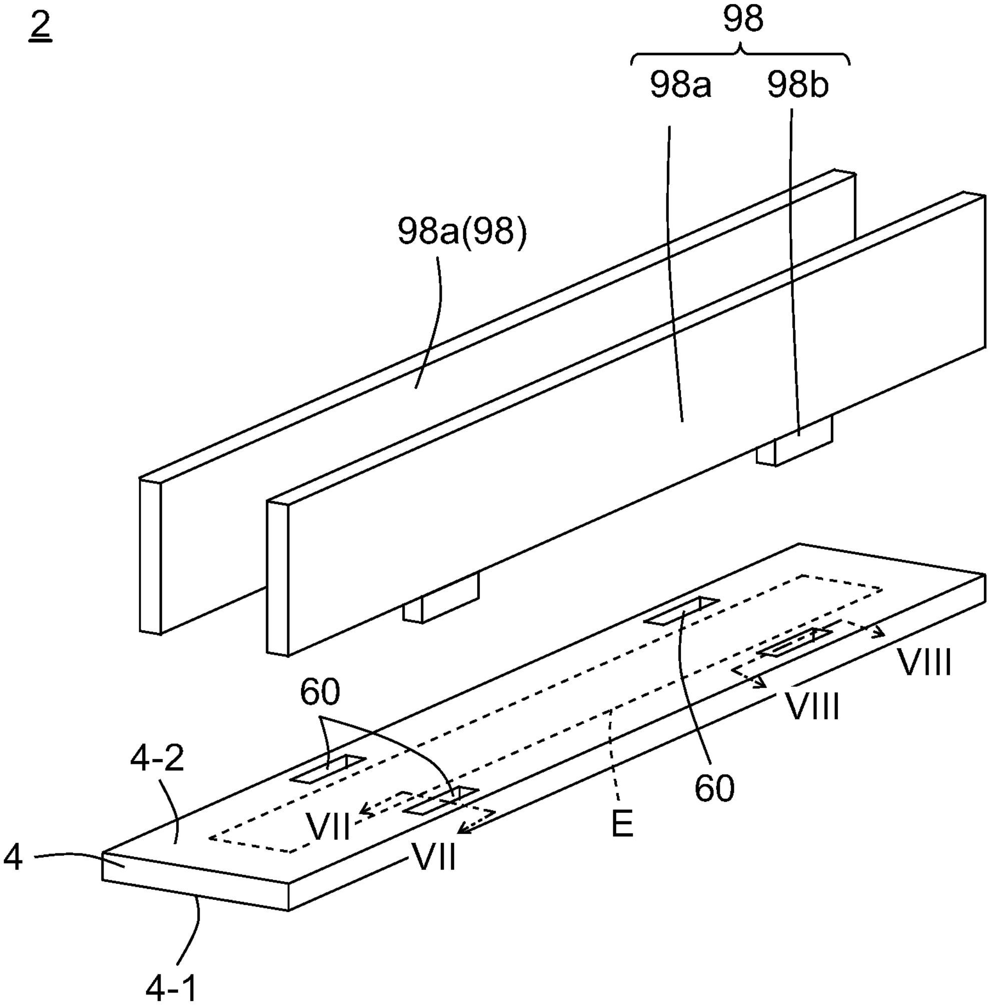
FIG. 6 is a disassembled perspective view of the liquid ejection head in FIGS. 1A and 1B.
Figure 7:
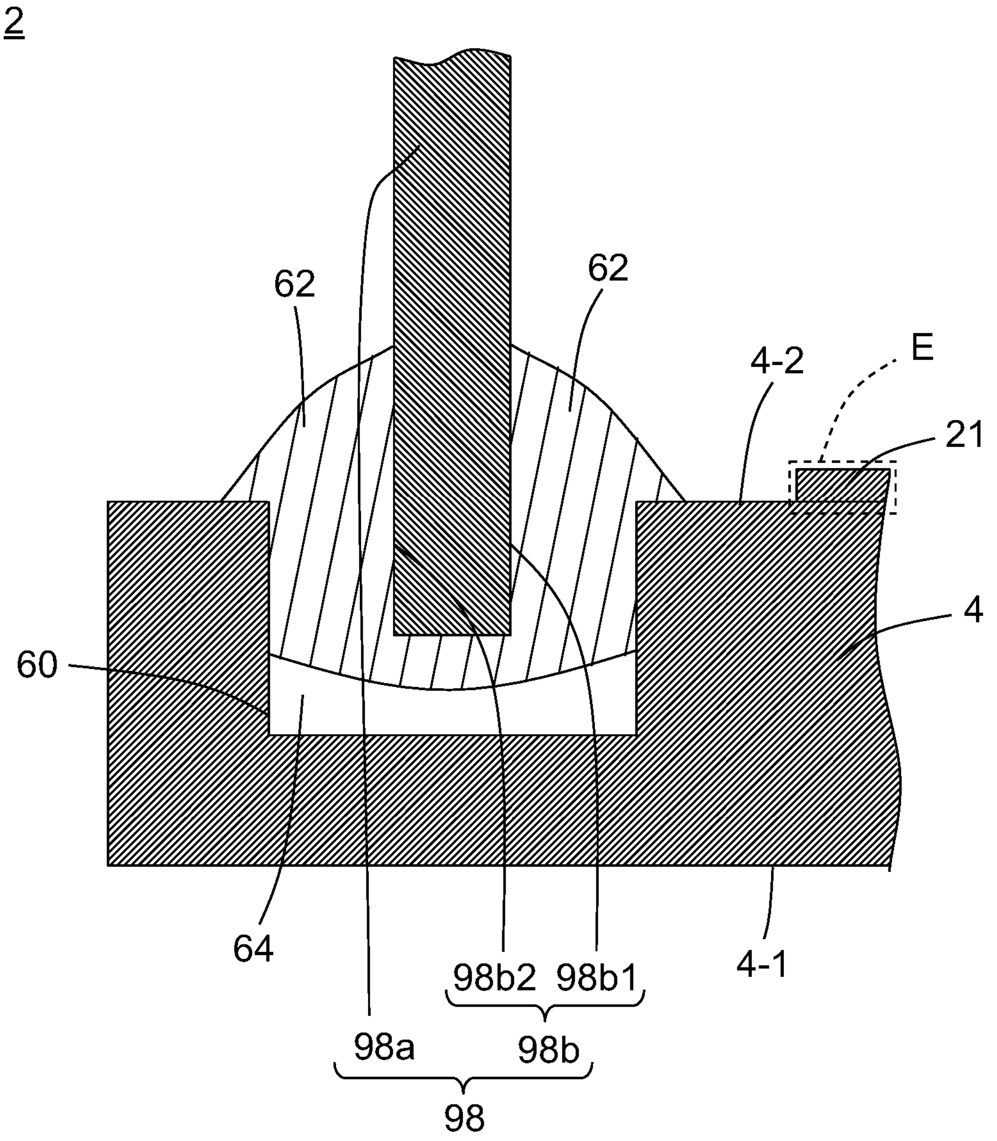
FIG. 7 is a cross-sectional view along the VII-VII line in FIG. 6.
Figure 8:
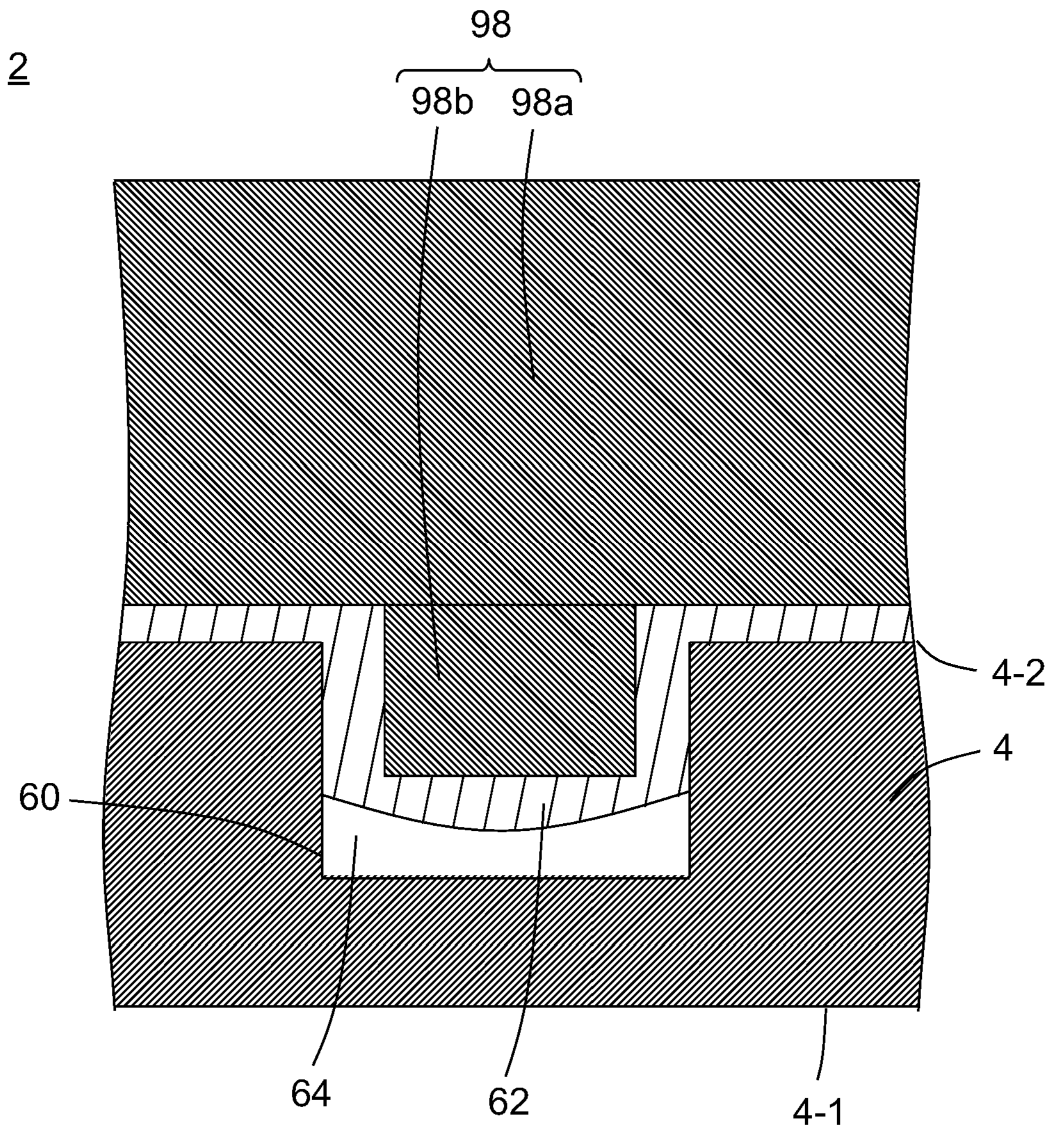
FIG. 8 is a cross-sectional view along the VIII-VIII line in FIG. 6.

The sealing structure of the cover member 98 will be explained by using FIGS. 6 to 8. FIG. 6 is a disassembled perspective view showing an outline of the liquid ejection head 2. Note that, FIG. 6 shows only the channel member 4 and cover member 98. FIG. 7 is a cross-sectional view along the VII-VII line in FIG. 6. FIG. 8 is a cross-sectional view along the VIII-VIII line in FIG. 6. Note that, FIGS. 7 and 8 show only the channel member 4, cover member 98, sealing members 62, and piezoelectric actuator substrate 21.

The channel member 4 has grooves 60 outside the pressurizing region E in the pressurizing chamber surface 4-2. The grooves 60 are formed long in the long direction of the channel member 4. The grooves 60 do not pass through the channel member 4 and are provided up to midway in the thickness direction of the channel member 4.

The cover member 98 has a side plate 98*a* and fixing portions 98*b*. The side plate 98*a* is provided along the long direction of the channel member 4 and is formed in a flat plate shape. The fixing portions 98*b* extend from the side plate 98*a* toward the channel member 4. The fixing portion 98*b* has a first side surface 98*b*1 and second side surface 98*b*2. The first side surface 98*b*1 is positioned on the pressurizing region E side. The second side surface 98*b*2 is positioned on the opposite side to the pressurizing region E. The fixing portion 98*b* is accommodated in the groove 60 in the channel member 4 and is positioned in a state where it is separated from the groove 60. The fixing portion 98*b* is fixed to the channel member 4 by a sealing member 62. Due to this, the cover member 98 is provided standing on the channel member 4. The channel member 4 and cover member 98 are sealed by the sealing member 62.

The cover member 98 can be formed by metal, alloy, or plastic. In order to make the difference in thermal expansion between the channel member 4 and the cover member 98 small and thereby improve the sealing property of the liquid ejection head 2, the channel member 4 and the cover member 98 may be made of materials having close coefficients of thermal expansion or may be made of the same material.

The sealing member 62 is positioned between the fixing portion 98*b* and the groove 60 and seals the channel member 4 and the cover member 98. In more detail, the sealing member 62 is positioned between the fixing portion 98*b* and the bottom surface of the groove 60. Further, the sealing member 62 is positioned between the first side surface 98*b*1 and the surface of the groove 60 which faces the first side surface 98*b*1. Further, the sealing member 62 is positioned from the first side surface **98*b*1 to the pressurizing chamber surface 4-2. For this reason, the sealing member 62 covers the edge of the groove 60** on the pressurizing region E side.

Further, the sealing member 62 is positioned between the second side surface **98*b*2 and the surface of the groove 60 which faces the second side surface 98*b*2. Further, the sealing member 62 is positioned from the second side surface 98*b*2 to the pressurizing chamber surface 4-2. For this reason, the sealing member 62 covers the edge of the groove 60** on the opposite side to the pressurizing region E.

As shown in FIG. 8, a sealing member 62 is positioned between the fixing portion **98*b* and the groove 60. In more detail, the sealing member 62 is positioned between the fixing portion 98*b* and the bottom surface of the groove 60. Further, the sealing member 62 is positioned between the fixing portion 98*b* and the side surface of the groove which is perpendicular to the long direction. Further, the sealing member 62 is positioned between the side plate 98*a* and the channel member 4. In more detail, the sealing member 62 is positioned between the bottom surface of the side plate 98*a* and the pressurizing chamber surface 4-2**.

The sealing member 62 has a clearance 64 between the fixing portion **98*b* and the groove 60. The clearance 64 is positioned on the entirety of the bottom surface of the groove 60**.

The sealing member 62 can be formed by epoxy resin or urethane resin or the like.

The sealing member 62 for example can be formed by the following method. First, the sealing member 62 before curing is coated on the lower part of the cover member 98. In more detail, the sealing member 62 before curing is provided by dipping on the cover member 98 so as to be deposited at the lower side of the side plate **98*a* and the entire area of the fixing portion 98*b*. Next, the cover member 98 is inserted into the channel member 4 so that the fixing portion 98*b* of the cover member 98 is accommodated in the groove 60. Further, the sealing member 62** can be formed by curing.

Note that, the sealing member 62 before curing may be coated on the first side surface **98*b*1 and second side surface 98*b*2 so as to seal the fixing portion 98*b* after the sealing member 62 before curing is coated in the groove 60 and the cover member 98 is provided standing on the channel member 4** as well.

Here, if the channel member 4 and the cover member 98 direct contact, when viewed from a micro perspective, a clearance was formed between the channel member 4 and the cover member 98. When the ink mist reaches the clearances between the channel member 4 and the cover member 98, the ink mist enters into the clearance and ends up reaching the pressurizing region E. If the ink mist reaches the pressurizing region E, sometimes the individual electrodes 25 on the piezoelectric actuator substrate 21 positioned in the pressurizing region E will be short-circuited.

In the liquid ejection head 2 in the present embodiment, the sealing members 62 are positioned between the fixing portions **98*b* and the grooves 60. In other words, the sealing members 62 are interposed so that the fixing portions 98*b* and the grooves 60 do not contact each other. That is, when viewed in a micro perspective, the sealing members 62 are positioned in the clearances formed between the fixing portions 98*b* and the grooves 60**.

Due to that, between the fixing portions **98*b* and the grooves 60, there is no interface at which the channel member 4 and the cover member 98 directly contact. As a result, even in a case where the ink mist penetrates to the internal portion of the sealing members 62, it becomes harder for the ink mist to spread along the interface. Therefore, the ink mist becomes harder to penetrate to the pressurizing region E, therefore a liquid ejection head 2** improved in the sealing property can be obtained.

Further, in the liquid ejection head 2 in the present embodiment, clearances 64 may be positioned between the fixing portions **98*b* and the grooves 60** as well.

According to the above configuration, even in a case where the ink mist penetrates to the internal portion of the sealing members 62, the penetrated ink mist can be accommodated in the clearance 64. Due to that, the ink mist becomes harder to penetrate to the pressurizing region E, therefore a liquid ejection head 2 improved in the sealing property can be obtained.

Note that, the clearance 64 may be positioned between the first side surface **98*b*1 and the surface of the groove 60 which faces the first side surface 98*b*1 as well. Further, the clearance 64 may be positioned between the second side surface 98*b*2 and the surface of the groove 60 which faces the second side surface 98*b*2** as well.

Further, in the liquid ejection head 2 in the present embodiment, the sealing member 62 may be positioned from the first side surface **98*b*1 up to the pressurizing chamber surface 4-2** as well.

According to the above configuration, the edge of the groove 60 on the pressurizing region E side can be covered by the sealing member 62. As a result, the ink mist penetrated in the internal portion of the groove 60 becomes harder to reach the pressurizing region E due to the presence of the sealing member 62 positioned at the edge of the groove on pressurizing region E side.

Further, in the liquid ejection head 2 in the present embodiment, the sealing member 62 may be positioned between the side plate **98*a* and the channel member 4** as well.

According to the above configuration, there is no interface at which the channel member 4 and the cover member 98 directly contact even between the side plate **98*a* and the channel member 4. As a result, even in a case where the ink mist penetrates to the internal portion of the sealing member 62, the ink mist becomes harder to spread along the interface. Therefore, the ink mist becomes harder to penetrate to the pressurizing region E, and thus a liquid ejection head 2** improved in the sealing property can be obtained.

Figure 9:
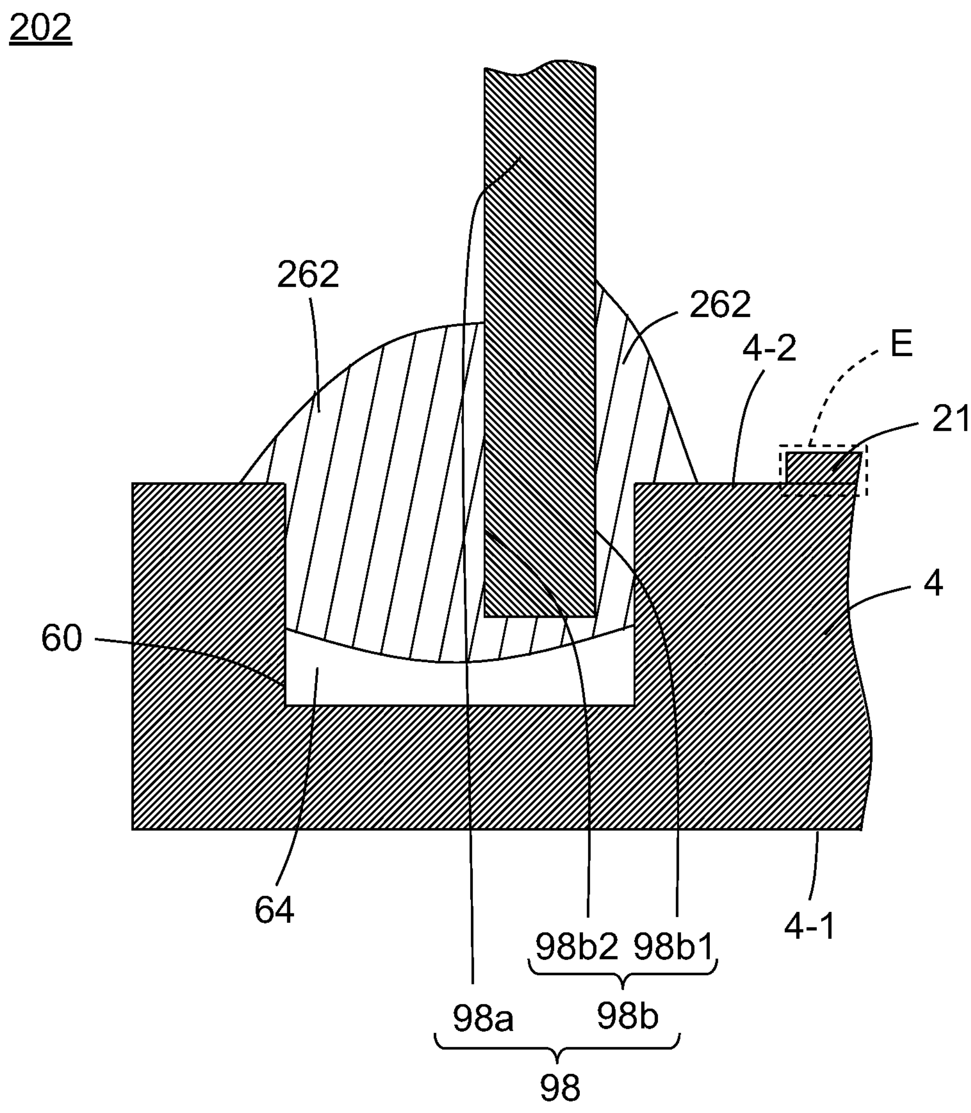
FIG. 9 is a cross-sectional view which shows a liquid ejection head in another embodiment and corresponds to FIG. 7.
Figure 10:
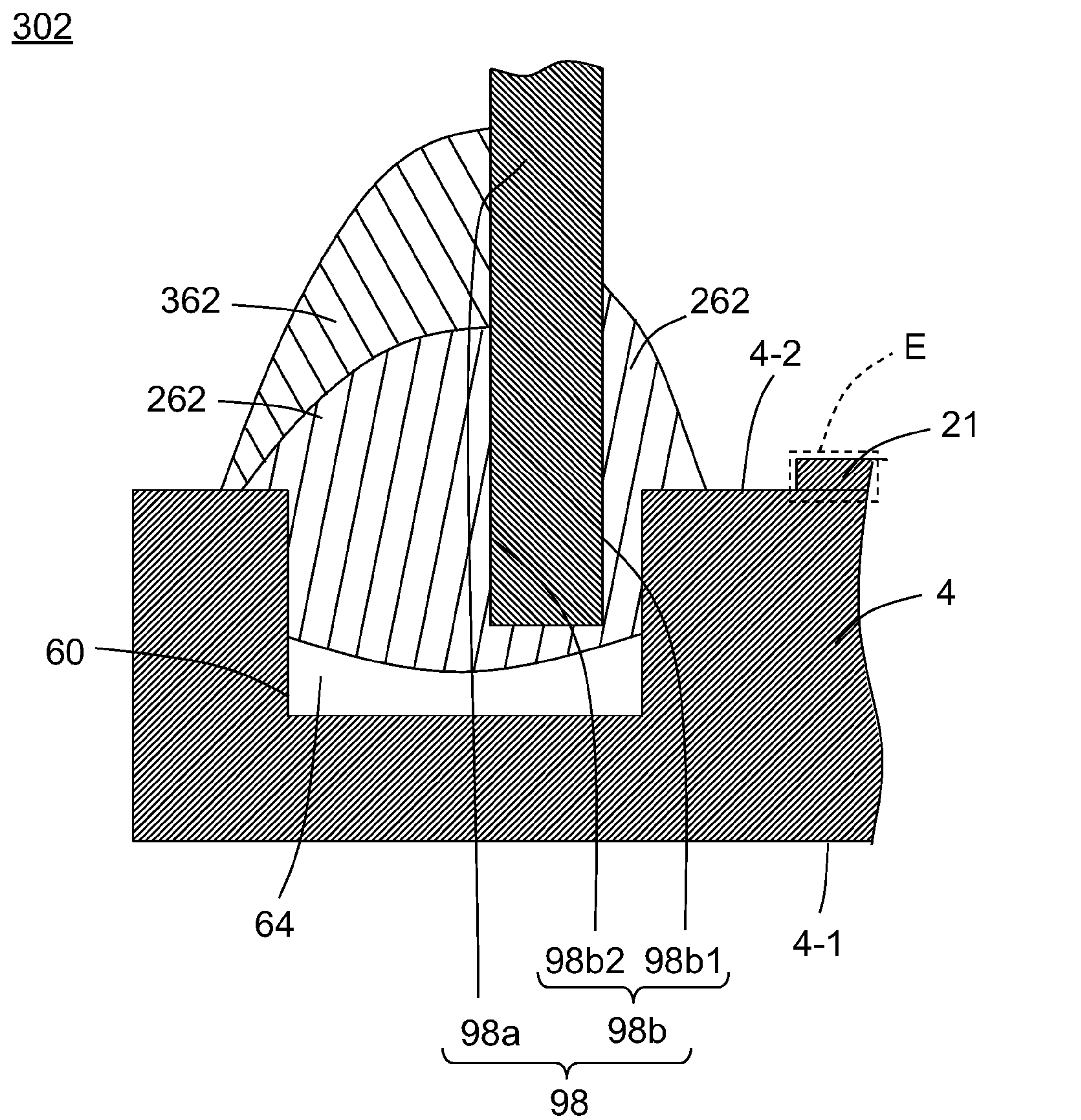
FIG. 10 is a cross-sectional view which shows a liquid ejection head in another embodiment and corresponds to FIG. 7.
Figure 11:
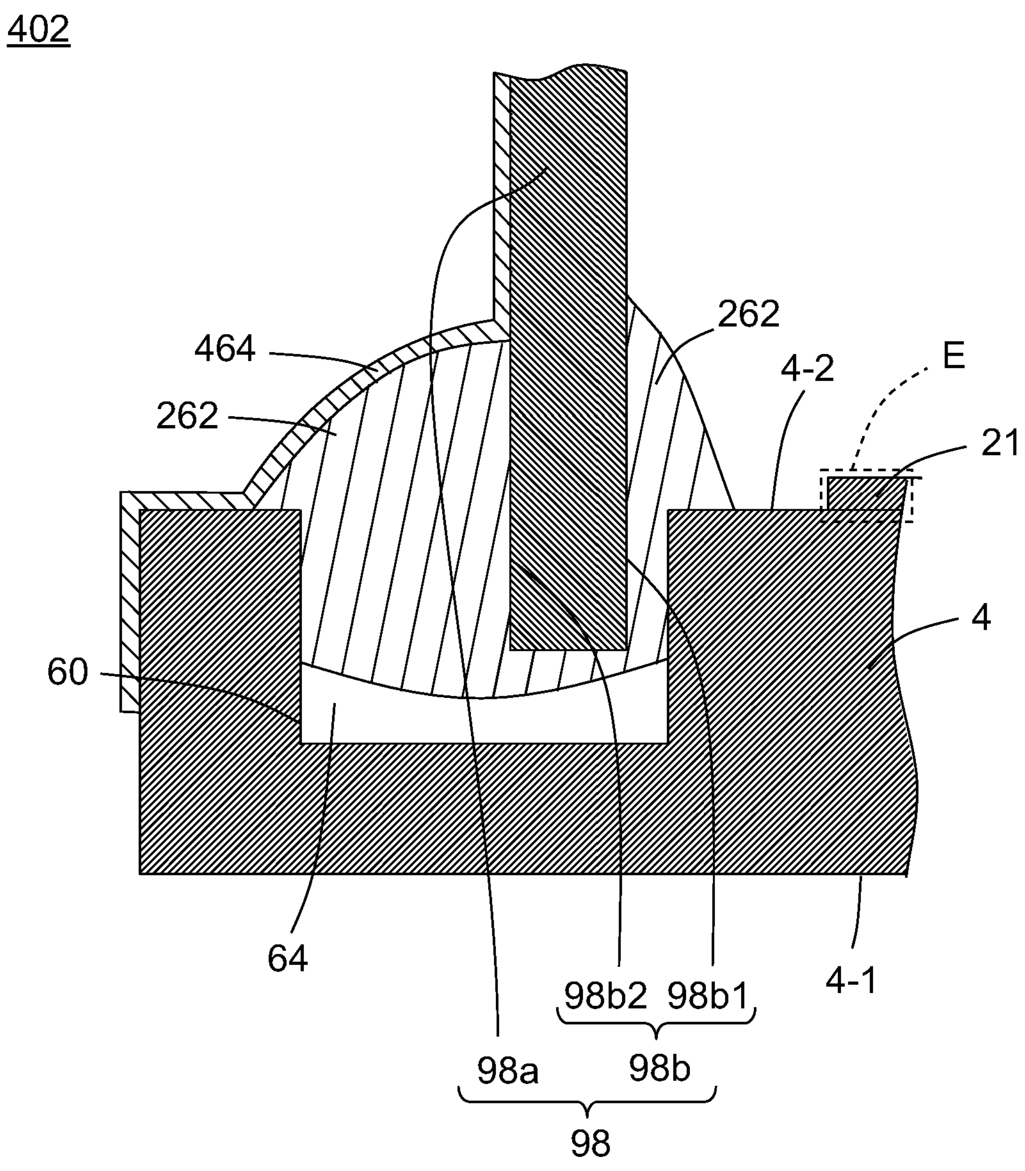
FIG. 11 is a cross-sectional view which shows a liquid ejection head in another embodiment and corresponds to FIG. 7.

Next, other embodiments of the liquid ejection head will be explained by using FIGS. 9 to 11. The liquid ejection heads 202 and 302 shown in FIGS. 9 and 10 are the same in the fundamental structures as that shown in FIGS. 1 to 8. However, the structures of the sealing members 262 and 362 are different. Further, a liquid ejection head 402 shown in FIG. 11 differs in a point of provision of a water repellent film 464. Note that, regarding the same portions, the same notations will be attached to them, and explanations will be omitted.

As shown in the liquid ejection head 202 in FIG. 9, the position of the fixing portion **98*b* in the groove 60 may be different from that in the liquid ejection head 2 as well. Specifically, the distance between the first side surface 98*b*1 and the surface of the groove 60 which faces the first side surface 98*b*1 may be shorter than the distance between the second side surface 98*b*2 and the surface of the groove 60 which faces the second side surface 98*b*2 as well. In other words, the fixing portion 98*b* may be positioned closer to the pressurizing region E side in the groove 60 as well. Due to that, the volume of the sealing member 262 positioned on the first side surface 98b1 side can be made smaller than the volume of the sealing member 262 positioned on the second side surface 98b2** side.

According to the above configuration, stress which is generated in the sealing member 262 positioned on the first side surface 98b1 can be made smaller than the stress generated in the sealing member 262 positioned on the second side surface 98b2. Due to that, the sealing member 262 positioned on the first side surface 98b1 becomes harder to peel, therefore a liquid ejection head 202 improved in the sealing property can be provided.

Further, the volume of the sealing member 262 positioned between the second side surface 98b2 and the surface of the groove which faces the second side surface 98b2 can be made larger, therefore it becomes harder for the ink mist to penetrate to the pressurizing region E from the external portion.

Further, the height from the pressurizing chamber surface 4-2 of the sealing member 262 positioned on the first side surface 98b1 side may be higher than the height from the pressurizing chamber surface 4-2 of the sealing member 262 positioned on the second side surface 98b2 side.

According to the above configuration, even in a case where an external force is generated in the cover member 98, the cover member 98 becomes harder to fall over toward the pressurizing region E. As a result, a possibility of breakage of the pressurizing region E can be lowered.

Note that, the distance between the fixing portion 98b and the groove can be obtained by cutting the liquid ejection head 202 in a direction perpendicular to the long direction and measuring the distance based on the cut surface. The same is true for the height from the pressurizing chamber surface 4-2 of the sealing member 262 positioned on the first side surface 98b1 side.

Further, as shown in FIG. 1, the printer 1 in the present embodiment may have a head case 85 accommodating the liquid ejection head 2 therein and an air blower 84 which is positioned in the head case 85 and ventilates the interior of the head case 85.

According to the above configuration, by circulating the air in the head case 85 by the air blower 84, the internal environment of the head case 85 can be made closer to the constant. Due to that, precise printing of an image can be carried out. Note that, by activating the air blower 84, the ink mist becomes easier to spread in the head case 85. However, the liquid ejection head 2 in the present embodiment is configured so that the sealing property is improved with respect to the ink mist, so the ink mist is harder to reaches the pressurizing region E.

Note that, in the present embodiment, a displacement element 30 using piezoelectric deformation was shown as the pressurizing part. However, the pressurizing part is not limited to this. Another element may be employed so far as it is able to pressurize the liquid in the pressurizing chambers 10. For example, the pressurizing part may be one heating the liquid in the pressurizing chambers 10 to a boil to thereby generate pressure or one using a MEMS (micro electro mechanical system).

Next, another embodiment will be explained by using FIG. 10. The liquid ejection head 302 is different in the second sealing member 363 from the liquid ejection head 202.

The liquid ejection head 302 has the first sealing member 262 and second sealing member 362. The first sealing member 262 is the same as the sealing member 262 in the liquid ejection head 202, therefore an explanation is omitted.

The second sealing member 362 is positioned on the first sealing member 262 on the second side surface 98b2 side. The second sealing member 362 is formed by a material different from that for the first sealing member 262. For example, when the first sealing member 262 is formed by an epoxy resin, the second sealing member 362 may be formed by a urethane resin. Further, when the first sealing member 262 is formed by a urethane resin, the second sealing member 362 may be formed by an epoxy resin. Due to that, even if ink mists having different compositions reach the first sealing member 262 and the second sealing member 362, a possibility of breakage can be lowered.

In the liquid ejection head 302 in the present embodiment, the height of the second sealing member 362 on the second side surface 98b2 side may be higher than the height of the first sealing member 262 on the first side surface 98b1 side.

According to the above configuration, the amount of the second sealing member 362 and the amount of the first sealing member 262 which are positioned on the second side surface 98b2 side can be made larger than the amount of the first sealing member 262 on the first side surface 98b1 side. Due to that, the ink mist becomes harder to reach the pressurizing region E, therefore the sealing property of the liquid ejection head 302 can be improved.

The first sealing member 262 and second sealing member 362 for example can be formed by the following method. As explained before, the first sealing member 262 before curing is provided by dipping and the first sealing member 262 is dried. Next, the second sealing member 362 before curing is coated on the second side surface 98b2 side. Further, the first sealing member 262 and the second sealing member 362 can be prepared by simultaneously curing them. Note that, the first sealing member 262 may be cured, then the second sealing member 362 coated and cured as well.

Another embodiment will be explained by using FIG. 11. The liquid ejection head 302 differs from the liquid ejection head 202 in the point that a water repellent film 464 is provided on the second sealing member 262.

The water repellent film 464 is positioned on the second sealing member 262. In more detail, the water repellent film 464 is positioned on the second side surface 98b2, on the side plate 98a, on the pressurizing chamber surface 4-2, and on the side surface of the channel member 4.

The water repellent film 464 has a higher water repellency with respect to ink than the second sealing member 262. Due to that, the water repellent film 464 becomes harder to be impregnated with ink than the second sealing member 262. For the water repellent film 464, for example, use can be made of a UV-curable resin. When forming the water repellent film 464 by a UV curable water repellent film, it may be coated on the liquid ejection head 402 on which the second sealing member 262 was cured, by using a brush, wiper, or writing brush, then it may be cured by irradiation of UV rays. Note that, the water repellency with respect to the ink can be confirmed by for example measuring a static contact angle or dynamic contact angle using a contact angle meter.

Here, the second sealing member 262 positioned on the first side surface 98b1 side is exposed to the external portion, so is easily influenced by the ink or ink mist. Further, if the ink penetrates to the second sealing member 262, sometimes the second sealing member 262 is deteriorated.

Contrary to this, the liquid ejection head 402 in the present embodiment has the water repellent film 464 on the second sealing member 262. Due to that, even if the ink or ink mist contacts the water repellent film 464, it is repelled by the water repellent film 464. As a result, the ink or ink mist becomes harder to penetrate to the second sealing member 262, therefore the second sealing member 262 is harder to be deteriorated.

Further, the water repellent film 464 may extend from the top of the second sealing member 262 up to the top of the cover member 98 as well. Due to that, the water repellent film 464 is positioned on the interface between the second sealing member 262 and the cover member 98, therefore corrosion from the interface between the second sealing member 262 and the cover member 98 becomes harder to occur. Note that, the water repellent film 464 may be positioned over the entire surface of the cover member 98 as well. In that case, the water repellency is further improved.

Further, the water repellent film 464 may extend from the top of the second sealing member 262 up to the top of the pressurizing chamber surface 4-2 as well. Due to that, the water repellent film 464 is positioned on the interface between the second sealing member 262 and the pressurizing chamber surface 4-2, therefore corrosion from the interface between the second sealing member 262 and the pressurizing chamber surface 4-2 becomes harder to occur.

Further, the water repellent film 464 may extend up to the top of the side surface of the channel member 4 as well. Due to that, the water repellency of the side surface of the channel member 4 is improved. Note that, the water repellent film 464 may be positioned over the entire surface of the channel member 4 as well. In that case, the water repellency is further improved.

REFERENCE SIGNS LIST

1 . . . printer
2 . . . liquid ejection head
2*a* . . . head body
4 . . . channel member
  4-1 . . . ejection hole surface
  4-2 . . . pressurizing chamber surface
5 . . . manifold (common channel)
6 . . . constricted part
8 . . . ejection hole
10 . . . pressurizing chamber
12 . . . individual channel
14 . . . individual supply channel
21 . . . piezoelectric actuator substrate
  21*a* . . . piezoelectric ceramic layer (vibration plate)
  21*b* . . . piezoelectric ceramic layer
24 . . . common electrode
25 . . . individual electrode
26 . . . connection electrode
27 . . . dummy connection electrode
28 . . . surface electrode
30 . . . displacement element (pressurizing part)
40 . . . reservoir
41 . . . reservoir body
42 . . . reservoir channel
51 . . . branched channel member
52 . . . branched channel
60 . . . groove
62, 262, 362 . . . sealing members
64 . . . clearance
90 . . . housing
92 . . . signal transmission part
98 . . . cover member
  98*a* . . . side plate
  98*b* . . . fixing portion
    98*b*1 . . . first side surface
    98*b*2 . . . second side surface

The invention claimed is:

1. A liquid ejection head comprising:
a channel member comprising an ejection hole, a pressurizing chamber connected with the ejection hole, an ejection hole surface on an ejection hole side of the channel member, and a pressurizing chamber surface on a pressurizing chamber side of the channel member;
a pressurizing part in a pressurizing region of the pressurizing chamber surface;
a cover member on the channel member; and
a water repellent film on the cover member.

2. The liquid ejection head according to claim 1, further comprising a sealing member which seals the cover member and the channel member, wherein the water repellent film is located on the sealing member.

3. The liquid ejection head according to claim 2, wherein the water repellent film extends from the cover member to the sealing member.

4. The liquid ejection head according to claim 2, wherein the water repellent film is located on the pressurizing chamber surface.

5. The liquid ejection head according to claim 4, wherein the water repellent film is located on a side surface of the channel member.

6. The liquid ejection head according to claim 5, wherein the water repellent film extends from the pressurizing chamber surface to the side surface.

7. The liquid ejection head according to claim 5, wherein the water repellent film extends from the cover member to the side surface.

8. The liquid ejection head according to claim 2, wherein
the channel member comprises a groove located in the pressurizing chamber surface but outside the pressurizing region,
the cover member comprises a fixing portion located in the groove, and
the sealing member is located between the fixing portion and the groove.

9. The liquid ejection head according to claim 8, wherein
the water repellent film is located on a side surface of the channel member, and
a length of the water repellent film on the side surface is shorter than a depth of the groove in a depth direction of the groove.

10. The liquid ejection head according to claim 8, wherein
a clearance of the sealing member is located between the fixing portion and a lower surface of the groove.

11. The liquid ejection head according to claim 8, wherein
the fixing portion comprises a first side surface that faces the pressurizing part, and a second side surface opposite to the first side surface, and,
when viewed in a cross-section,
a distance between the first side surface and a side surface of the groove which faces the first side surface is shorter than a distance between the second side surface and a side surface of the groove which faces the second side surface.

12. The liquid ejection head according to claim 8, wherein
the fixing portion comprises a first side surface that faces the pressurizing part, and a second side surface opposite to the first side surface, and
the sealing member extends from the first side surface to the pressurizing chamber surface.

13. The liquid ejection head according to claim 12, wherein
the sealing member extends from the second side surface to the pressurizing chamber surface, and, when viewed in a cross-section, a height of the sealing member from the pressurizing chamber surface to the second side surface is higher than a height of the sealing member from the pressurizing chamber surface the first side surface.

14. The liquid ejection head according to claim 13, wherein the water repellent film extends from the sealing member to the pressurizing chamber surface.

15. The liquid ejection head according to claim 14, wherein the channel member comprises a side surface connecting the ejection hole surface and the pressurizing chamber surface, and the water repellent film extends to the side surface.

16. The liquid ejection head according to claim 8, wherein the cover member comprises a side plate, the fixing portion which extends from the side plate toward the channel member, and the sealing member is located between the side plate and the channel member.

17. A recording apparatus comprising:

the liquid ejection head according to claim 1;

a conveying part which conveys printing paper with respect to the liquid ejection head; and a control part which controls the liquid ejection head.

18. A recording apparatus comprising:

the liquid ejection head according to claim 1;

a head case in which the liquid ejection head is accommodated; and an air blower which is located in the head case and ventilates an interior of the head case.

* * * * *